J. C. POTTER.
AUTOMATIC TURRET LATHE.
APPLICATION FILED MAY 15, 1913.
1,197,541. Patented Sept. 5, 1916.
6 SHEETS—SHEET 1.
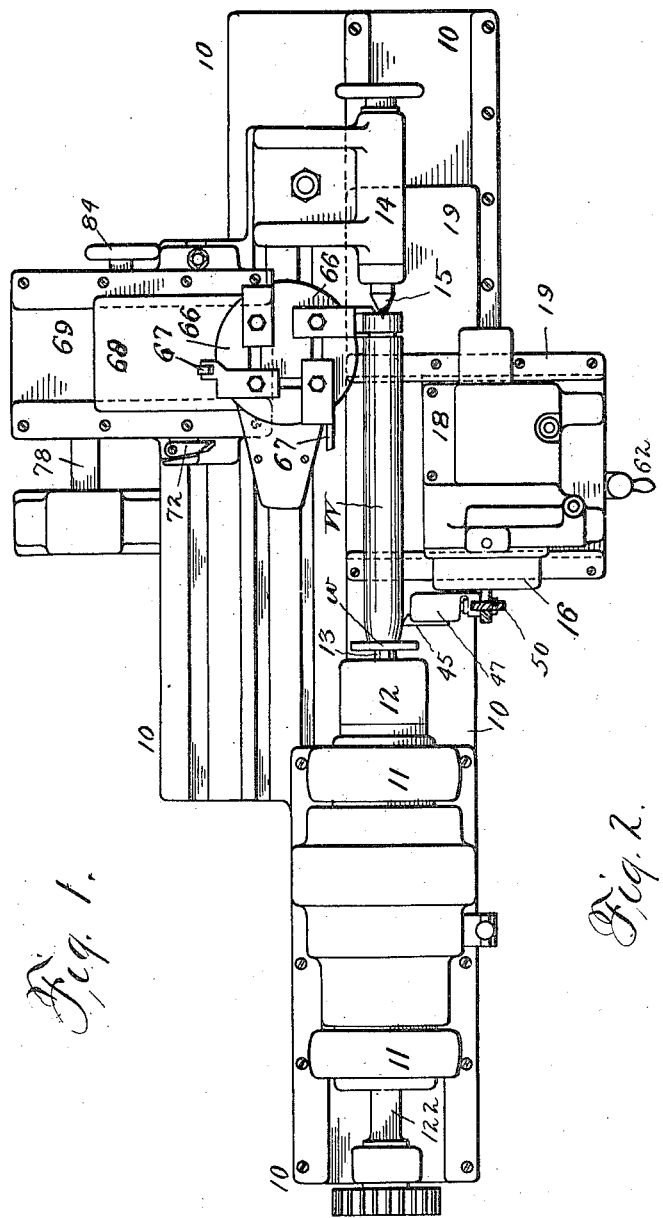
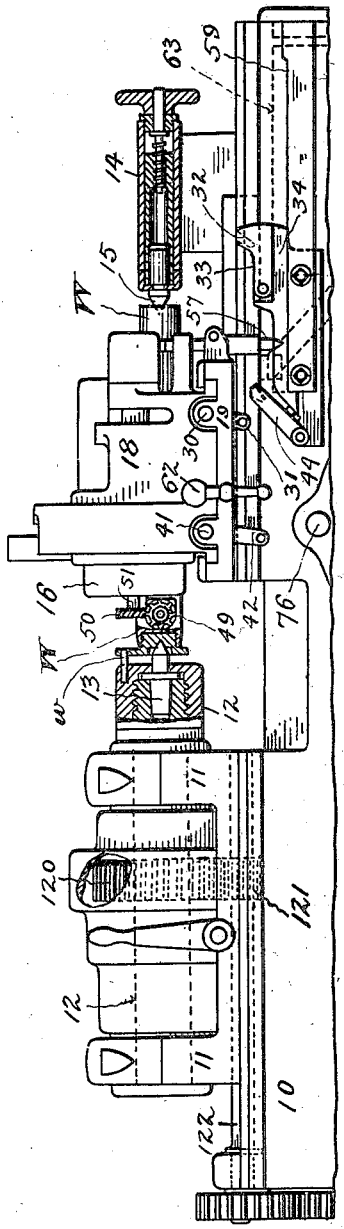
WITNESSES:
INVENTOR
James C. Potter
BY Chas. J. Williamson
ATTORNEY

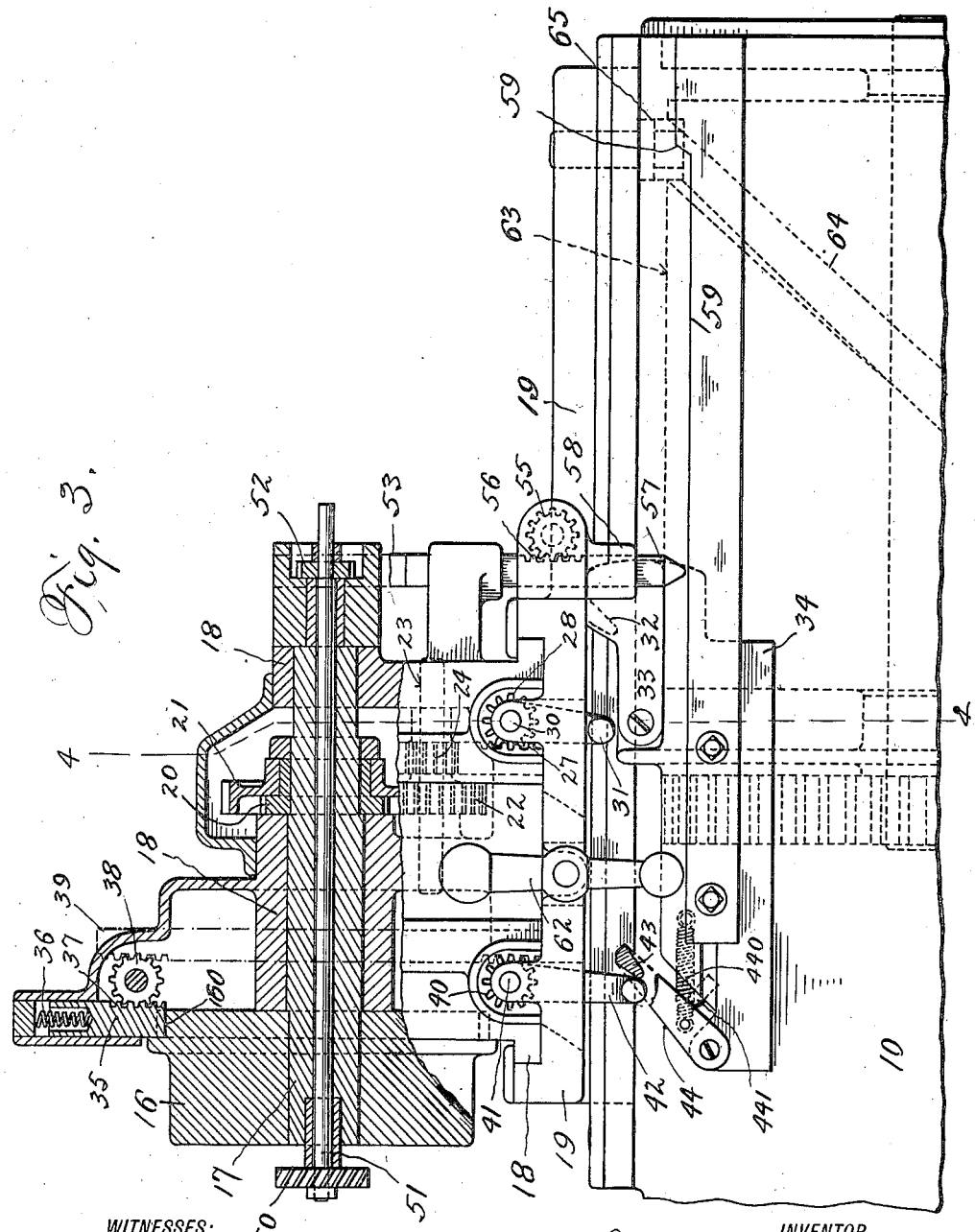

J. C. POTTER.
AUTOMATIC TURRET LATHE.
APPLICATION FILED MAY 15, 1913.

1,197,541.

Patented Sept. 5, 1916.
6 SHEETS—SHEET 3.

WITNESSES:
George L. Barnes
A. P. Hayes

INVENTOR
James C. Potter
BY
Chas. J. Williamson
ATTORNEY

J. C. POTTER.
AUTOMATIC TURRET LATHE.
APPLICATION FILED MAY 15, 1913.

1,197,541.

Patented Sept. 5, 1916.
6 SHEETS—SHEET 4.

WITNESSES:
George L. Barnes
A. P. Noyes

INVENTOR
James C. Potter
BY
Chas. J. Williamson
ATTORNEY

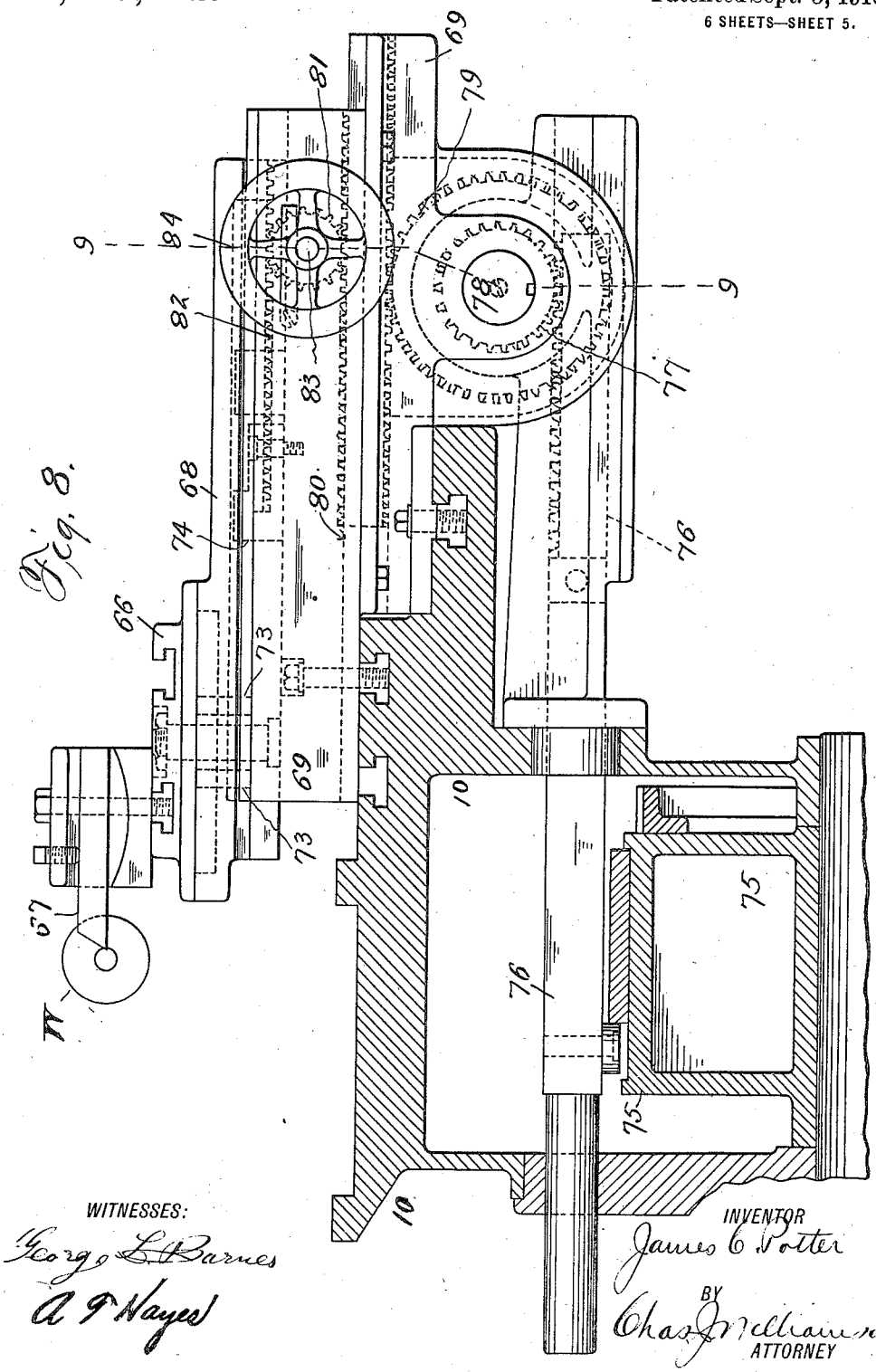

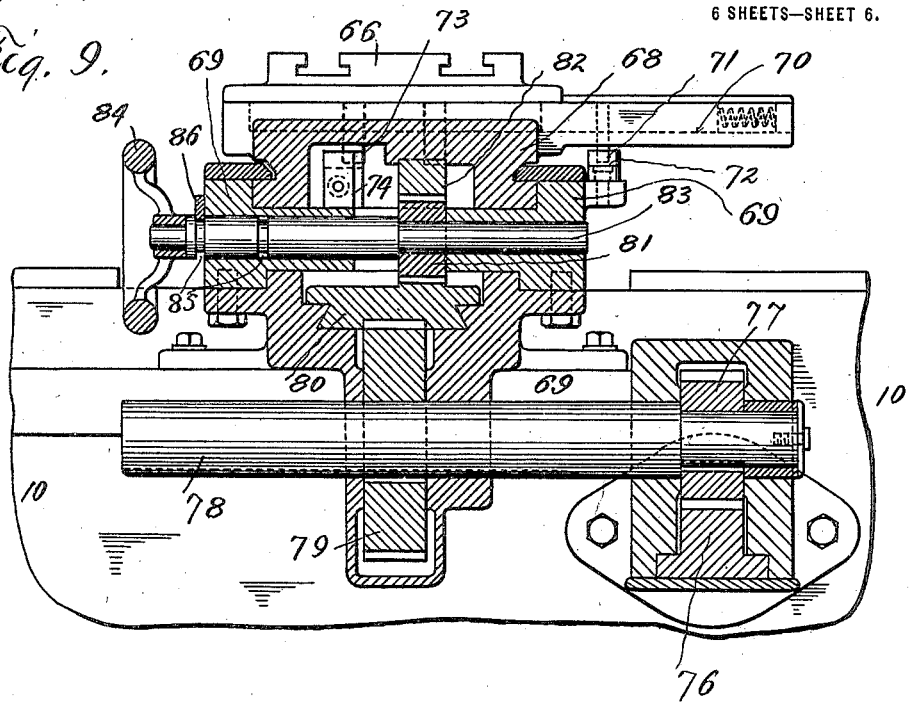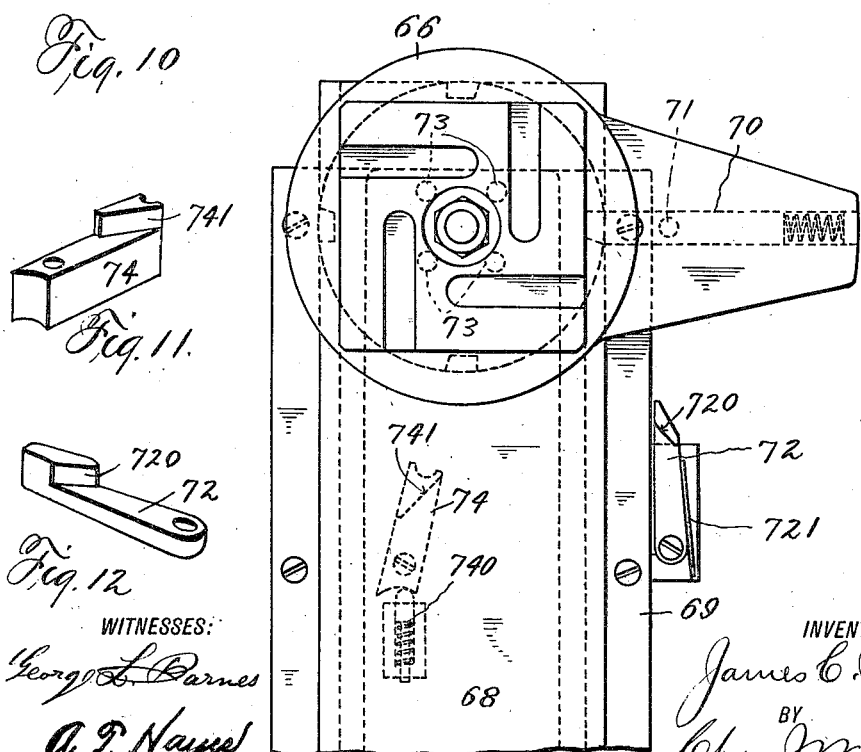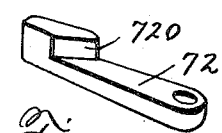

UNITED STATES PATENT OFFICE.

JAMES C. POTTER, OF PAWTUCKET, RHODE ISLAND.

AUTOMATIC TURRET-LATHE.

1,197,541. Specification of Letters Patent. Patented Sept. 5, 1916.

Application filed May 15, 1913. Serial No. 767,918.

*To all whom it may concern:*

Be it known that I, JAMES C. POTTER, of Pawtucket, in the county of Providence, and in the State of Rhode Island, have invented a certain new and useful Improvement in Automatic Turret-Lathes, and do hereby declare that the following is a full, clear, and exact description thereof.

My invention relates to automatic turret lathes, and generally stated my object is to provide a lathe of this description by which bars or other work requiring to be placed on centers can be turned, but besides this general purpose, I have in view the production of mechanism by which the lathe will turn work of wide range of diameter, as for example, from one inch to fifteen inches and whose adjustment will be very simple, both in respect of the adjusting operation and the parts required for adjustment.

Figure 4:
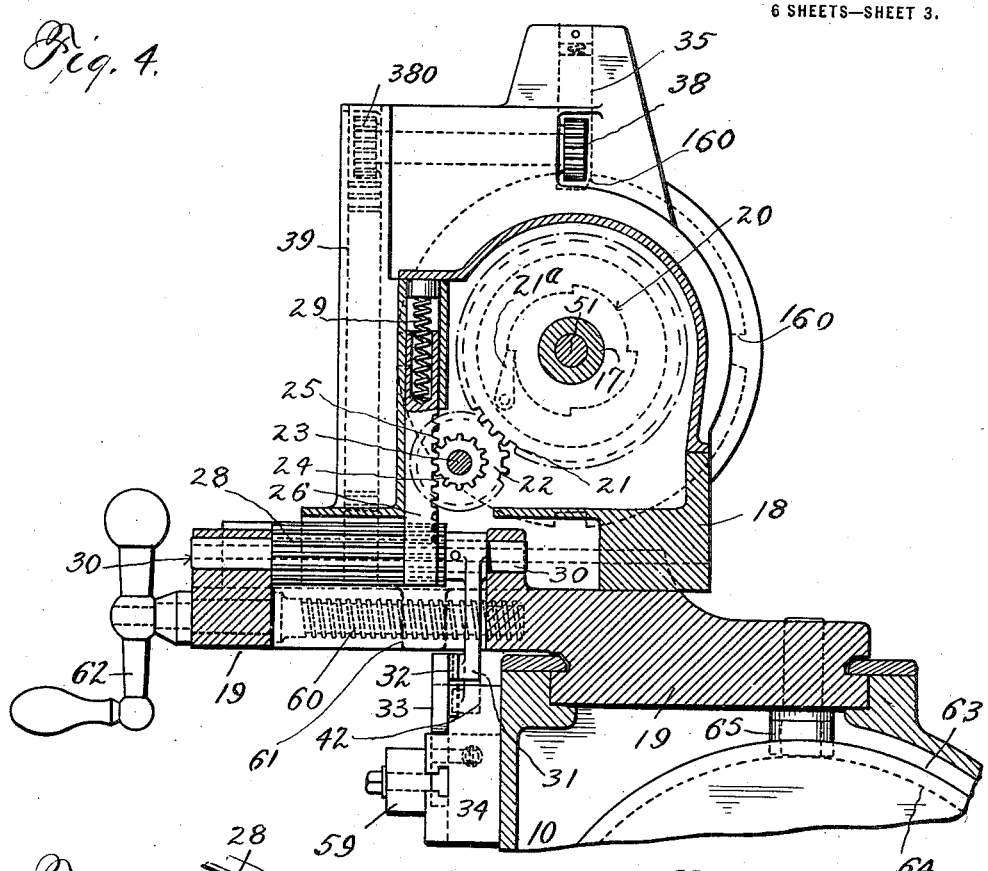
Figures 5, 5A:
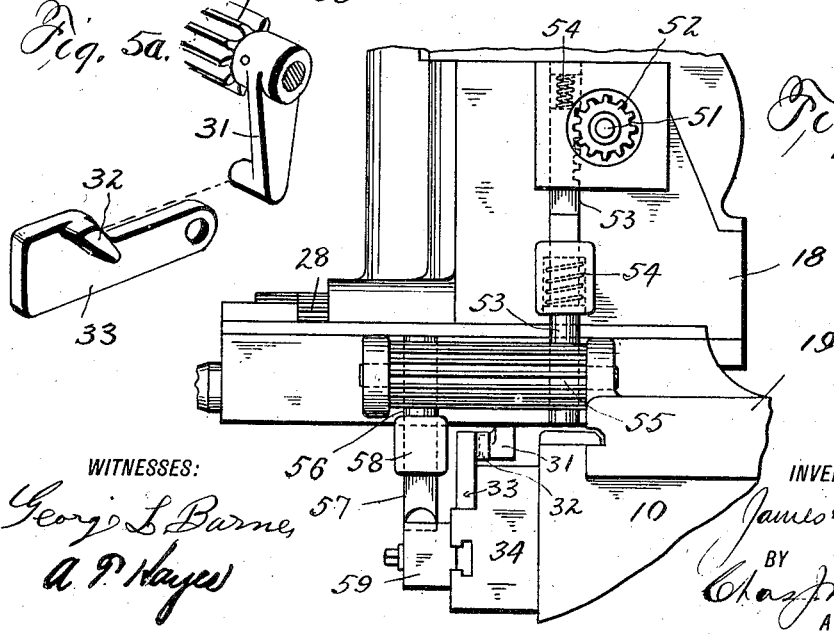
Figure 6:
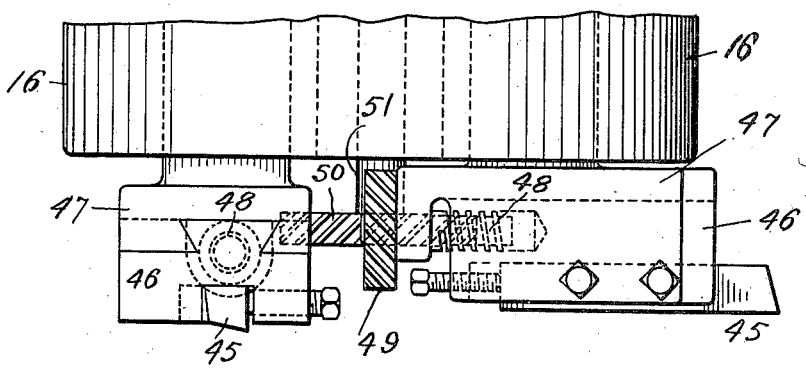
Figure 7:
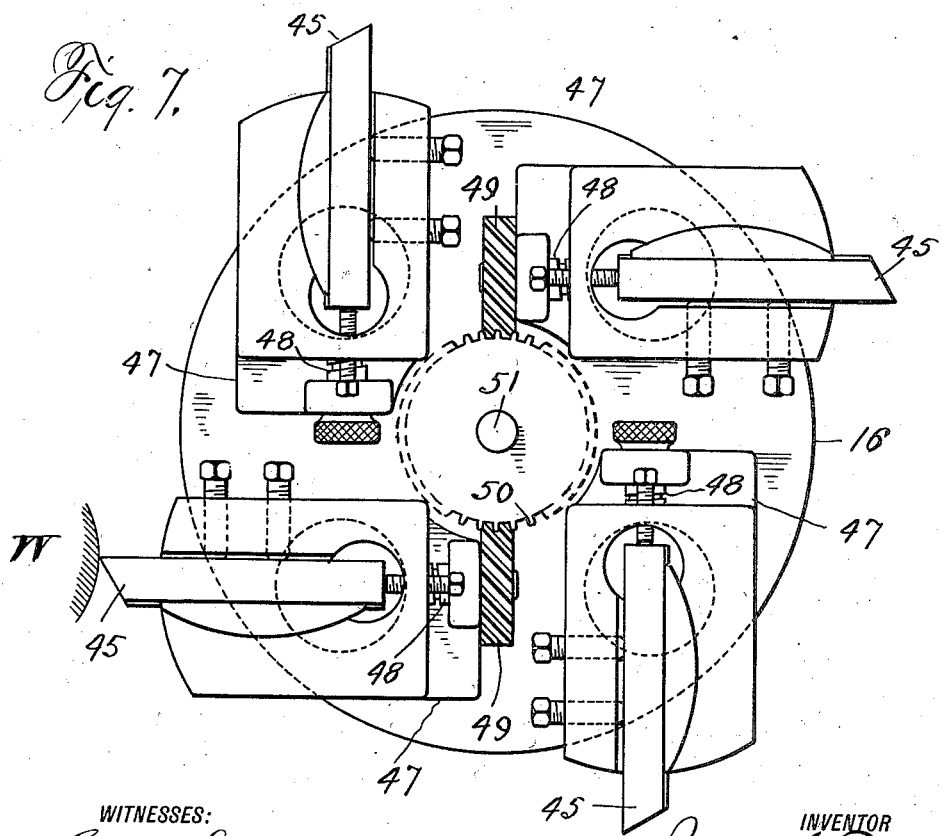

In the drawings, Figure 1 is a top plan view of an automatic turret lathe embodying my invention; Fig. 2 is a side elevation of the upper portion of the same, parts of the head and tail stock being shown in section; Fig. 3 is a detail view partly in elevation and partly in section, of the main turret operating mechism; Fig. 4 is a cross section on the line 4—4 of Fig. 3; Fig. 5 is a detail end view of the main turret tool operating devices; Fig. 5ª is a detail view in perspective of the lever and trip device of the turret revolving mechanism; Fig. 6 is a detail top plan view of the tool-carrying portion of the main turret; Fig. 7 is an end elevation thereof; Fig. 8 is a view partly in section and partly in elevation of the cross-slide and the turret carried thereby and the operating mechanism for these parts; Fig. 9 is a section on the line 9—9 of Fig. 8; Fig. 10 is a detail, top plan view of the cross slide turret, and its operating mechanism; Fig 11 a detail view of the cross slide turret revolving pawl; Fig. 12 a detail view of the pawl for releasing the locking bolt of the cross slide turret.

In the embodiment of my invention illustrated in the drawings, a base or frame 10 is employed, upon which at one end is mounted a head stock 11, having a spindle 12 with a center 13, and at the other end is mounted an adjustable tail stock 14 having a revolving center 15. A piece of work W is shown as placed upon the centers, a dog *w* connecting it with the spindle 12 so that the work will revolve with the latter.

The spindle 12 may be revolved by any desired means. As shown it has a gear 120 (see Fig. 2) in mesh with a driving pinion 121 on a shaft 122 receiving motion from a suitable source.

My invention contemplates the use of two turrets, one for carrying the series of tools for the turning operations which involve movement longitudinally of the work, and which, for distinction I shall term the main turret, and the other carrying the series of tools for operations that involve movement transversely of the work, and which being carried by a slide whose movements are crosswise of the machine, I shall, for convenient distinction, term the cross slide turret.

I shall first describe the main turret and its operating mechanism. Said main turret 16, instead of being mounted so that its axis travels in a line with the axis of the spindle, is situated at one side of the spindle axis, or is offset, so that it travels, or reciprocates alongside of the work W. Said turret 16, is mounted on a horizontal shaft 17 journaled in a standard 18 supported on the main slide or carriage 19, so as to be slidable transversely of the latter and thereby effect the adjustment of the cutting tools according to the diameter of the work to be turned, said adjustment being effected as hereinafter explained.

For revolving the turret step by step, to bring the cutting tools successively into working position, the turret shaft 17 has, at its inner end a ratchet wheel 20, on the hub of which is journaled an oscillatory gear wheel 21 carrying a feed dog or pawl 21ª which engages the teeth of the ratchet wheel, and turns the latter through a partial rotation when the gear wheel 21 makes a partial turn in the direction for feed. The gear 21 is in mesh with a pinion 22 on a horizontal shaft 23 journaled in the standard 18, and alongside the pinion 22 is a pinion 24 which is engaged by rack teeth 25 on a vertical bar 26, which also has rack teeth 27 in mesh with a pinion 28 journaled in bearings in the slide or carriage 19, and extending transversely thereof. Said pinion 28 is elongated so that, as the turret carrying standard is shifted to adjust the tools to the diameter of the work, the rack bar 26 will remain in mesh with the pinion throughout the various adjustments. The rack bar 26 is pressed yieldingly downward, by a coiled spring 29, to return the pawl carrier gear 21 after a feeding movement, and to lift said rack bar for a feeding movement, there is attached to the shaft 20 of the pinion 28, a downwardly extending crank arm or lever 31, whose lower free end is in position to engage a lug 32 on the side of an arm 33 pivoted to a block 34 on the side of the machine frame 10, such engagement of the lever end and the arm lug 32 taking place when the turret slide moves rearward. As the lever 31 moves upward when it swings forward from its contact with the arm lug 32, the lever end passes over said lug as the turret slide moves rearward and the lug 32 is carried by the pivoted arm 33 so that when the turret slide again moves forward and the lever end encounters the lug 32 the lug-carrying arm 33 will rock upward and permit the continued forward movement of the lever 31 with the turret slide, the lug-carrying arm 33 dropping back into its position to again actuate the lever 31 when the turret slide again moves rearward. The arm 33 when in position to have its lug 32 rock the lever 31, has its lower edge in contact with a shoulder on the block 34 as is clearly shown in Figs. 4 and 5, and it rocks upward from said stop shoulder when in the forward movement of the turret slide, the lever 31 engages the lug 32 and by a camming action on the lug 32 lifts the arm 33 which drops to said stop shoulder after the lever end passes out of contact with the lug 32. The lug-engaging end of the lever, is laterally offset, (see Figs. 4, 5 and 5ª) to enable it to coact with the lug 32, as described.

The main turret 16 has in its periphery near its rear end a series of equidistant locking notches 160 one for each tool adapted to be engaged by a locking bolt 35 mounted for vertical movement in a guide in the standard 18 above the turret, and yieldingly held into engagement with a notch 34 by a coiled spring 36. The bolt 35 has rack teeth 37 on one side which are in mesh with a pinion 38 and meshing with a pinion 380 on the same shaft with the pinion 38 is a vertically movable rack bar 39 which is also in mesh with a pinion 40 elongated like the pinion 28, and to the shaft 41 of which pinion 40 is attached a lever 42 similar to the lever 31, and adapted, by the rearward travel of the turret slide, to engage a horizontal lug 43 on an arm 44 pivoted to the block 34, and thereby be rocked and through the pinion and rack bar connection described, the locking bolt 35 will be lifted and the turret released, ready to be revolved by the mechanism already described. On the forward movement of the turret slide the lever 42 engaging the lug 43 on the arm 44, trips past the latter, by the upward swinging of the arm 44, which carries said lug 43. The construction and action of the lever 42 and the arm 44 are similar to those of the lever 31 and its coöperating arm 33, and in the case of the lever 44 a spring 440 yieldingly and normally holds it against a stop 441 on the supporting block 34.

The main turret is shown as provided with four cutting tools 45 which may be of the simplest possible type. Each is carried by its own slide 46 mounted upon a block 47 that is attached to the end face of the turret, and for each slide 46 there is an adjusting screw 48 by means of which the cutting tool may be shifted toward and from the work W. Such shifting may be done automatically, and for the purpose of turning irregular forms, in which case, the adjusting screw 48 may, as shown, have attached to it a spiral gear 49 that meshes with a spiral gear 50 on a shaft 51 concentric with and extending through the turret shaft 17, and which shaft 51 has a pinion 52 in mesh with a vertical rack bar 53, that is mounted in guides on the standard 18, and is yieldingly pressed downward by coil springs 54. The rack bar 53 also meshes with a horizontal elongated pinion 55 journaled in bearings on the turret slide, the pinion being elongated to maintain the engagement of the rack bar therewith throughout the range of adjustment of the turret toward and from the work W to suit the various diameters to be turned. Also meshing with the pinion 55 is a rack 56 on the upper part of a vertical plunger 57 mounted in a guiding lug 58 on the turret slide 19, the lower end of which plunger is in position to coact with the upper side of a guide or former 59 which has a contour corresponding to that of the form or shape of the work to be turned. The guide or former 59 is conveniently bolted to the block 34. It will be seen that as the turret slide reciprocates, the plunger 57 will follow the contour of the upper side of the former 59, and through the gearing between the plunger and the tool slides 46, the cutting tools will be made automatically to traverse the work according to the contour of said former.

It will be understood, of course, that the automatic movement of the cutting tools, I have just described is independent of the bodily adjustment of the turret 16 by the transverse shifting of the standard 18 on which the turret is mounted, for suiting the diameter of the work to be turned. A convenient device for such shifting of the standard 18, is a feed screw 60 that has a swiveled connection with the turret slide 19, and passes through a threaded lug 61 depending from the standard 18, the screw having a handle 62 at the front of the lathe. In view of the use of the elongated pinions and racks by which the movements of the turret locking bolt and the turret revolving mechanism are controlled, it will be seen that adjustment of the turret to suit different diameters of work, involves nothing more than the turning of the adjusting screw, for whatever the adjustment is, the members of the locking and revolving mechanism are always in operative relation without any adjustment thereof being required.

The turret slide 19 is reciprocated, as is usual, from a cam drum 63, such for example, as that of my United States Patent No. 1,040,751, issued October 8, 1912, to which reference may be made for a disclosure of the same and the means for revolving it, it being sufficient herein to say that said drum 63 has a peripheral groove 64 into which projects a roller stud 65 on the underside of the slide.

The cross slide turret 66 is of the flat type and carries upon its upper side a circular series of cutting tools 67. It is mounted upon a slide 68 that is reciprocable transversely of a carriage 69 that is adjustable longitudinally of the lathe bed to suit the length of the work, or the positions where the cross-slide turret tools are to work. Said turret 66 is indexed or locked at each station by a spring-held bolt 70, which is automatically released by the coaction of a stud 71 on the bolt and a pawl 72 on the carriage 69, as the slide 68 reciprocates; and the step-by-step rotation of the turret 66 is effected by the coaction of a series of studs 73 (equal in number to the number of the turret tools) on the underside of the turret 66, and a pawl 74 mounted on the carriage 69, such coaction being produced by the reciprocation of the turret slide 68. When the pawl 72 is engaged by the stud 71 to release the locking bolt 70 the pawl 72 has a bearing against the side of the carriage 69 which results in the camming outward of the locking bolt as its stud 71 passes over the inclined outer end of the pawl 72. On the reverse movement of the cross slide turret 68, the stud 71 engaging an inclined surface 720 on the pawl 72 will swing the pawl 72 against the pressure of a holding spring 721 and the stud 71 will trip past the pawl 72. In the interval of disengagement of the locking bolt 70 from the turret 66, the latter will be rotated one step by the action of the feed pawl 74. The feed pawl 74 is yieldingly held in stud-engaging position by a spring pressed plunger 740 which permits the tripping of the pawl 74 out of the path of a stud 73 after a feeding operation, when the slide 68 again moves forward to the work, said stud 73 engaging an inclined surface 741 on the pawl at such time to produce such tripping.

The reciprocation of the turret slide 68 is effected by a cam drum 75 that acts on a horizontal bar 76 having rack teeth which mesh with a pinion 77 on a shaft 78, and splined to the shaft 78 so as to be slidable along the same is a gear 79 that is shiftable along with the carriage 69 and meshes with rack teeth on the underside of a slide 80, and on the upper side of the slide 80 are rack teeth that engage a pinion 81 which meshes with a rack 82 on the underside of the turret slide 68, and by its revolution causes the travel of said slide 68. The pinion 81 is carried by a shaft 83 which is longitudinally movable so that the pinion 81 may be disconnected from the rack 82 when it is desired to shift the turret carrying cross slide to adjust its tools to work of different diameters. Said shaft has a hand-wheel 84 which forms a handle for shifting it longitudinally, and to secure the shaft from accidental movement when shifted to connect or disconnect pinion and rack 82 it has two annular grooves 85 adapted for engagement by a latch 86.

It will be understood that the cam drum 63 for the main turret slide and the cam drum for the turret-carrying cross slide, are geared to and receive motion from a common driving shaft, as in the case of my patent above mentioned.

While I have set forth certain details of construction as characterizing the machine shown in the drawings, it is to be understood that my invention is not restricted to such details of construction, but wide variations in construction of machines may be made which will involve no departure from the spirit of my invention as set forth in the claims.

Having thus described my invention what I claim is—

1. In a turret lathe the combination of head stock and tail stock having work-holding centers, a slide reciprocable in the direction of the axis of the work on the centers, a tool-carrying turret on said slide, the tools being mounted for movement thereon, means for automatically revolving the turret to bring its respective tools in position for work, comprising coacting members, one of which is connected with and fixed to the turret, and the other is relatively stationary, and which members remain in operative connection at all times, and means to shift the turret transversely of the direction of travel of the slide.

2. In a turret lathe the combination of head stock and tail stock having work-holding centers, a slide reciprocable in the direction of the axis of the work on the centers, a turret on said slide supporting movable tool holders whose direction of movement is transversely of the direction of travel of said slide, means to shift the turret transversely of the direction of travel of the slide, and means for reciprocating said tool holders comprising coacting members, one of which is connected with and fixed to the turret, and the other is relatively stationary and which remain in operative connection at all times.

3. In a turret lathe, the combination of a turret, its reciprocating slide, a guide or former, relative to which said slide moves, and means controlled by said guide or former acting to move turret tool, the tool itself being moved with reference to the turret.

4. In a turret lathe, the combination of head stock and tail stock having work-holding centers, a slide reciprocable in the direction of the axis of the work on the centers, a turret mounted on a horizontal axis on said slide and having a vertical tool-carrying face, a guide or former relative to which said slide moves, and means controlled by said guide or former acting to move turret tool, the tool itself being moved with reference to the turret.

5. In a turret lathe, the combination of a turret, its reciprocating slide, a guide or former relative to which said slide moves, a plurality of tool holders movably mounted on the turret, and means controlled by said guide or former to move each of said tool holders.

6. In a turret lathe, the combination of a turret, its reciprocating slide, a guide or former relative to which said slide moves, a plurality of tool holders movably mounted on the turret, a shaft concentric with the turret, an operative connection between said shaft and each of said tool holders whereby the latter may be moved, and means for rotating said shaft by said guide or former.

7. In a turret lathe, the combination of head stock and tail stock having work-holding centers, a slide reciprocable in the direction of the axis of the work on the centers, a turret, automatic turret-rotating mechanism, and a support for the turret and the turret-rotating mechanism mounted on said slide and shiftable transversely of the direction of travel of the slide, the turret rotating mechanism remaining in operative condition at all points of transverse adjustment of the slide.

8. In a turret lathe, the combination of head stock and tail stock having work-holding centers, a slide reciprocable in the direction of the axis of the work on the centers, a turret, automatic turret-rotating mechanism, automatic turret locking mechanism, and a support for the turret, the turret-rotating mechanism and the turret-locking mechanism mounted on said slide, and shiftable transversely of the direction of travel of the slide, said automatic turret-rotating and turret-locking mechanism remaining in operative condition at all points of transverse movement of the slide.

In testimony that I claim the foregoing I have hereunto set my hand.

JAMES C. POTTER.

Witnesses:
EARLES ROBERTS,
EDWARD J. FEELEY.